May 13, 1941.  W. F. GOWDY  2,241,812
MANUFACTURE OF RUBBER GOODS
Filed June 7, 1939
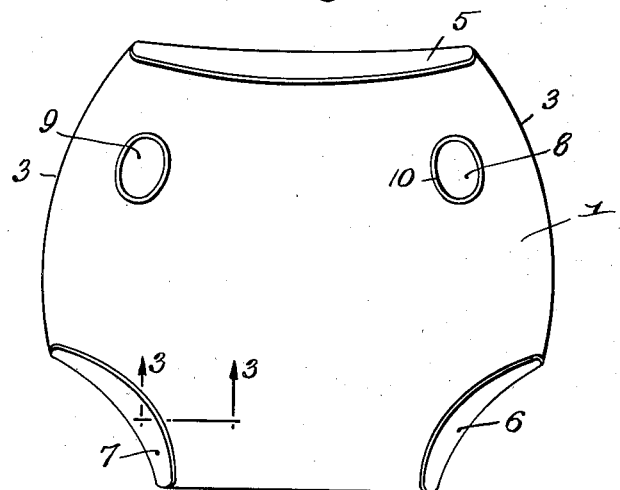
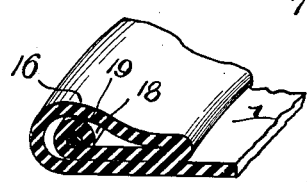
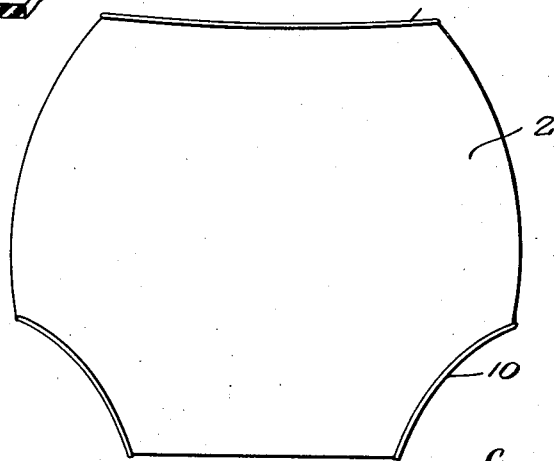
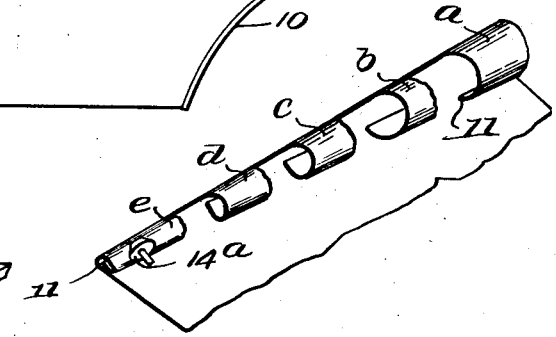
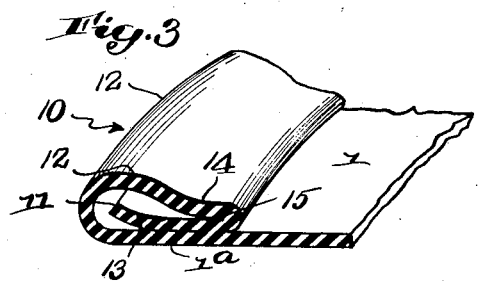
Inventor:
William F. Gowdy,
by Roberts Cushman & Woodbury
his Attys Patented May 13, 1941

2,241,812

UNITED STATES PATENT OFFICE 2,241,812

MANUFACTURE OF RUBBER GOODS

William F. Gowdy, Milford, Mass., assignor to Archer Rubber Company, Milford, Mass., a corporation of Massachusetts Application June 7, 1939, Serial No. 277,837

9 Claims. (Cl. 18—59)

This invention pertains to the manufacture of rubber goods from sheeted rubber, and more particularly to a finish for the marginal portion of a rubber article and to a method of forming such a finish. While the present invention is broadly useful in the manufacture of such articles as rain capes or coats, bathing suits or caps, undergarments, aprons, crib sheets, table covers, bags, piece goods, or the like, or in fact wherever it is desired to reinforce a margin of sheet rubber so as to impart a neat and ornamental finish, the invention has herein been illustrated by way of specific example as embodied in a baby pant.

Various methods of providing an edge finish for sheeted rubber are discussed in the patent to Gowdy No. 2,053,144, dated September 1, 1936, and the method which forms the specific subject matter of said patent has been found very useful and highly desirable for many purposes. However, for articles of very simple nature, particularly such as must be made at the lowest possible cost and which for sanitary or aesthetic reasons should be of utmost simplicity, and where a maximum possible elasticity and minimum edge thickness compatible with smooth finish and strength (especially at the borders of limb-receiving openings) are requisite, such prior method of procedure is not always considered altogether adequate.

While it is true that in the manufacture of dipped latex articles it has been proposed so to manipulate the goods as to cause the fluid latex to flow along the edge of the aperture as a marginal drop or bead which produces a slightly thickened, smoothly rounded, homogeneous and elastic edge finish when the latex coagulates, this method of procedure is slow, requires considerable care and skill and is correspondingly expensive, and is not practically applicable to goods made of sheeted rubber.

The principal object of the present invention is to provide an improved edge finish for rubber goods, particularly those made from sheeted rubber, and to an inexpensive and practical method of forming such a finish.

In accordance with the present invention the garment parts are first cut from uncured rubber sheeting and properly assembled and united in accordance with any usual and appropriate practice and then the edge finish is formed as herein set forth. The cutting of the garment parts is preferably carried out in accordance with the usual procedure employed in making articles from sheeted uncured rubber, the rubber sheeting being piled up (after coating with starch or the like, to prevent adhesion) so as to form a large number of superposed plies which are cut through simultaneously to the desired shape for the intended garment part. In accordance with this invention it is practical to provide the improved edge finish not only along exterior edges of the material or garment, but also around the borders or openings, even though the openings be of small dimensions and/or disposed unsymmetrically with respect to the vertical axis of the garment. This novel method provides a bead effect affording an edge finish having a smoothly rounded outer surface; it is integral with and consists wholly of the material of the article of which it forms a part, and approximates the same degree of elasticity as other parts of the garment.

Further objects and advantages of the invention will be pointed out in the following more detailed description and with reference to the accompanying drawing, wherein Fig. 1 is a front elevation of the improved baby pant;

Fig. 2 is a rear elevation of the garment shown in Fig. 1;

Fig. 3 is a section, to greatly enlarged scale, on the line 3—3 of Fig. 1;

Fig. 4 is a diagrammatic perspective view illustrating successive steps in the operation of providing the improved edge finish; and Fig. 5 is a view similar to Fig. 3, illustrating a modification.

Referring to the drawing, the numeral 1 designates the front member of the garment and the numeral 2 the rear member. The front and rear portions of the garment may be made as separate pieces, if desired, being cut according to a suitable pattern from uncured sheeted rubber and being assembled and united along the lines 3 and 4 to form the desired garment. The union of the several parts may be accomplished without recourse to stitches by methods common in the rubber industry. The garment thus prepared has the top or body-receiving opening 5, the leg-receiving openings 6 and 7, and preferably a pair of ventilating openings 8 and 9 in the front member of the garment, it being noted that as illustrated in the drawing the front member of the garment is of lesser superficial area than the rear member so that when the garment is folded flat the edges of the front member at the body and leg openings do not register with the corresponding edges of the rear member, a consequence of proper design such as to insure good fitting of the garment.

In accordance with the present invention each of the openings 5, 6, 7, 8 and 9 is finished throughout its entire periphery to form a rounded edge bead 10. As illustrated in Fig. 3, this edge bead 10 is formed by a bight or fold of the sheet material which envelops the raw or cut edge 11 of the rubber sheeting, the latter being directed outwardly, that is, toward the opening, the ply 13 of marginal material adjacent to the edge 11 being disposed between and concealed by the under ply 1a of the bight or fold which lies substantially in line with the body material of the garment and the upper ply 12 of the bight or fold. The several plies forming this beaded edge are integrally united throughout the length of the bead along the inner portion 14 of the bead, so that the plies coalesce as shown at 15 (Fig. 3). This coalescing of the several constituent plies is confined to the inner edge 14 of the thickened margin, the plies 1a and 12 which constitute the edge-forming bight being free from each other at the region of the raw edge 11, thus giving a soft and thick effect at the extreme outer edge while providing a sealed and sanitary union between the several plies.

In forming the bead the operator begins at any desired point in the periphery of one of the openings and progressively curls the marginal material, as indicated at a, b, c, d and e (Fig. 4), so that the raw edge 11 of the material is gradually turned in until it occupies the position shown in Fig. 3. When the edge 11 has approximately assumed this position, pressure is exerted upon the material substantially at the point 14 (Fig. 3), for example, by means of a roller 14a (Fig. 4) or equivalent means so as to cause the several superposed plies to coalesce at this point. This progressive curling, followed by pressing, is continued without interruption from the starting point around the entire periphery of the opening until the bead has been completed, whereupon the operator proceeds to the next opening, etc.

After each bead has thus been formed by rolling and pressing the marginal material, the entire garment is subjected to a curing operation so that in the finished garment the several plies of the bead are integrally joined by cured rubber.

In accordance with this method of procedure, it is not necessary to make use of any adhesive in forming the finishing bead even though the uncured rubber sheeting has been coated with starch or the like nor to use stitches or other extraneous means of securing the plies together.

While the operation is one which can be carried out by hand, it is preferred to use appliances such as more specifically described in the copending application of William F. Gowdy, Serial No. 277,838, filed June 7, 1939, such appliances comprising a hemmer scroll for progressively curling and turning in the raw edge and a presser-applying roll having a narrow edge which engages and coalesces the material as the latter emerges from the small end of the scroll.

While as herein illustrated the bead comprises but three thicknesses of material, it is contemplated that by using a proper hemmer scroll, the bead may be made thicker if desired, that is to say, to include more than three plies, as illustrated for example in Fig. 5, wherein the bead comprises the plies 1b, 16, 17, and 18. In this view a core strand 19 is also shown, such strand being of any desired material, either elastic or inelastic.

It is regarded as substantially essential that the bead have sufficient plies to ensure the concealment of the raw edge between finished surfaces. The bead thus provided is smooth, elastic, sanitary, and need not add to the thickness of the garment at the edge of the opening to such an extent as to make the garment seem clumsy or heavy. On the other hand, this edge finish provides sufficient reinforcement to prevent easy tearing even though the garment be stretched to a substantial extent during use.

While certain desirable embodiments of the invention have been illustrated by way of example, it is to be understood that the invention is not to be limited to the particular constructions herein illustrated, and furthermore that the invention is of broad utility and not necessarily confined in its application or scope to the particular garment herein described.

I claim:

1. Sheet material comprising rubber having a thickened margin consisting of a portion of the sheet material rolled upon itself to form three thicknesses with the raw edge curled upon itself to make a rounded edge-forming bight including upper and under plies, and to form a third ply disposed between the upper and under plies with its raw edge disposed within the bight, the upper and under plies being free from each other adjacent to the bend of the bight and in the vicinity of the raw edge, the several plies being integrally joined at the inner edge of said thickened margin by cured rubber, such integral joining of the plies extending throughout the entire length of the margin.

2. A baby pant of sheeted highly elastic rubber having leg openings, ventilating openings, and a body-receiving opening, each of said openings having a marginal finish bead having a rounded outer edge constituted by a bight of the material integrally joining inner and outer plies and having the raw edge of the material disposed within said bight and concealed by said plies, the bead-forming plies of each finish bead being free from each other at the region of the raw edge but being integrally united throughout the entire circumference of each of the respective openings along the inner edge of each respective bead.

3. A baby pant of sheeted highly elastic rubber having a body-receiving opening and leg openings, the front of the pant being of less superficial area than the back so that when the pant is folded flat the front and rear edges at the body-receiving and leg openings do not register, and a marginal finish bead bordering each of said openings, said bead consisting of a bight of the sheeted rubber whose bend defines a rounded edge for the opening and which comprises upper and under plies, and a third ply forming the raw edge of the rubber disposed between said upper and under plies, the several plies being integrally joined at the inner edge portion of the bead, the integral junction of the several plies extending entirely around the opening, said inner and outer plies being free from each other and from the third ply from the bend of the bight substantially to the inner edge portion of the bead.

4. A baby pant of sheeted highly elastic rubber having a body-receiving opening and leg openings, and ventilating openings in its front wall, each of said ventilating openings being of small superficial area as compared with the body or leg openings, each ventilating opening having a finish bead, said bead consisting of a portion of the sheet rubber curled upon itself to make a bight whose bend defines a rounded edge for the opening and which comprises upper and under plies, and a marginal ply disposed between said upper and under plies with its raw edge concealed within the bight, the bight-forming plies being free from each other and from the marginal ply intermediate the bend of the bight and the inner edge portion of the bead, the several plies being integrally united at said inner edge portion of the bead, said integral union extending entirely around the opening.

5. A garment of sheeted highly elastic rubber having an opening which is disposed unsymmetrically with respect to the longitudinal axis of the garment, said opening being bordered by a finish bead wherein the sheet material is rolled upon itself to form three or more plies with the raw edge concealed between inner and outer plies, the several bead-forming plies being free from each other except along the inner edge of the bead where they are integrally united by cured rubber.

6. Method of forming a marginal finish bead for sheet rubber which comprises as steps curling the margin of the sheeted rubber before curing so as to direct the raw edge outwardly and dispose it within a bight of the body material comprising integrally joined upper and under plies, subjecting the bight-forming plies along the inner edge only of the bead to pressure, thereby integrally to join said plies along the inner edge only of the bead while leaving the plies free from each other intermediate the outer and inner edges of the bead, and thereafter curing the rubber.

7. Method of forming a marginal finish bead for sheeted rubber which comprises as steps progressively curling the margin of the sheeted rubber from point to point thereby to dispose and conceal the raw edge between inner and outer plies of the material, progressively subjecting the marginal material to pressure from point to point immediately following the curling operation, the pressure being so applied as to coalesce the material forming the several plies and integrally to join the plies, and thereafter curing the rubber.

8. Method of making a garment of sheet rubber which comprises as steps preparing from uncured sheet rubber and uniting the constituent parts of the garment, progressively curling exposed edges of the sheeted rubber of the garment beginning at a given point in the edge and proceeding uninterruptedly along said edge so as to dispose the raw edge between concealing plies of the material and to form a marginal finish bead, subjecting the curled material at the inner edge portion only of the bead to pressure applied progressively along the edge immediately following the curling operation thereby integrally to join the constituent plies along the inner edge portion of the bead, and curing the garment.

9. Method of making baby pants of sheet rubber which comprises as steps providing and uniting pieces of uncured sheet rubber appropriate to form a pant having leg openings, ventilating openings and a body-receiving opening, and finishing each opening throughout its entire circumference by progressively curling the marginal material upon itself beginning at one point in the circumference of the opening and continuing about the entire circumference so as at all points to dispose the raw edge between concealing plies of the material, subjecting the curled material to pressure applied progressively about the periphery of the opening immediately following the curling operation thereby integrally to join the constituent parts of the bead, and curing the garment.

WILLIAM F. GOWDY.

CERTIFICATE OF CORRECTION.

Patent No. 2,241,812. May 13, 1941.

WILLIAM F. GOWDY.

It is hereby certified that error appears in the printed specification of the above numbered patent requiring correction as follows: Page 2, second column, lines 23 and 24, claim 1, strike out the words "rolled upon itself to form three thicknesses with the raw edge"; and that the said Letters Patent should be read with this correction therein that the same may conform to the record of the case in the Patent Office.

Signed and sealed this 17th day of June, A. D. 1941.

(Seal)

Henry Van Arsdale,
Acting Commissioner of Patents.